United States Patent [19]

Bonomi

[11] Patent Number: 5,080,748

[45] Date of Patent: Jan. 14, 1992

[54] CARD ASSEMBLY APPARATUS

[75] Inventor: Jaime Bonomi, Stoughton, Mass.

[73] Assignee: Bostec Systems, Inc., Canton, Mass.

[21] Appl. No.: 570,403

[22] Filed: Aug. 21, 1990

Related U.S. Application Data

[63] Continuation of Ser. No. 323,494, Mar. 14, 1990, Pat. No. 4,978,401.

[51] Int. Cl.$^5$ .................... B31F 7/00; B32B 31/00; B65G 47/00; B65H 43/00
[52] U.S. Cl. .................... 156/364; 156/538; 156/468; 156/552; 226/19; 198/345.1
[58] Field of Search .................... 156/64, 350, 361, 362, 156/363, 364, 378, 468, 552, 556; 226/3, 20, 22, 23; 271/227, 228; 198/345.1, 463.2

[56] References Cited

U.S. PATENT DOCUMENTS

| | | | |
|---|---|---|---|
| 2,778,474 | 1/1957 | Koning | 198/345.1 |
| 4,070,226 | 1/1978 | Crathern et al. | 156/364 |
| 4,202,092 | 5/1980 | Shibasaki et al. | 198/345.1 |
| 4,364,502 | 12/1982 | Frentress | 226/3 |
| 4,828,247 | 5/1989 | Matsuo et al. | 156/521 |

Primary Examiner—David A. Simmons
Assistant Examiner—Jeffrey G. Payne
Attorney, Agent, or Firm—Wolf, Greenfield & Sacks

[57] ABSTRACT

A current assembly apparatus and associated method for producing laminated cards such as credit cards including providing means for feeding printed card sheets to a laminating station and at the same time feeding top and bottom overlay webs also to the laminating station. The top overlay web is provided with a series of parallel-disposed magnetic stripes. Means are provided for controlling the feeding of the top overlay web and the card sheets so as to feed them concurrently to form a lamination. Means are also provided for controlling the inter-positional relationship or registration between the card sheet and the overlay web to maintain a predetermined positional arrangement between the magnetic stripe and a predetermined position on the card sheet.

21 Claims, 3 Drawing Sheets

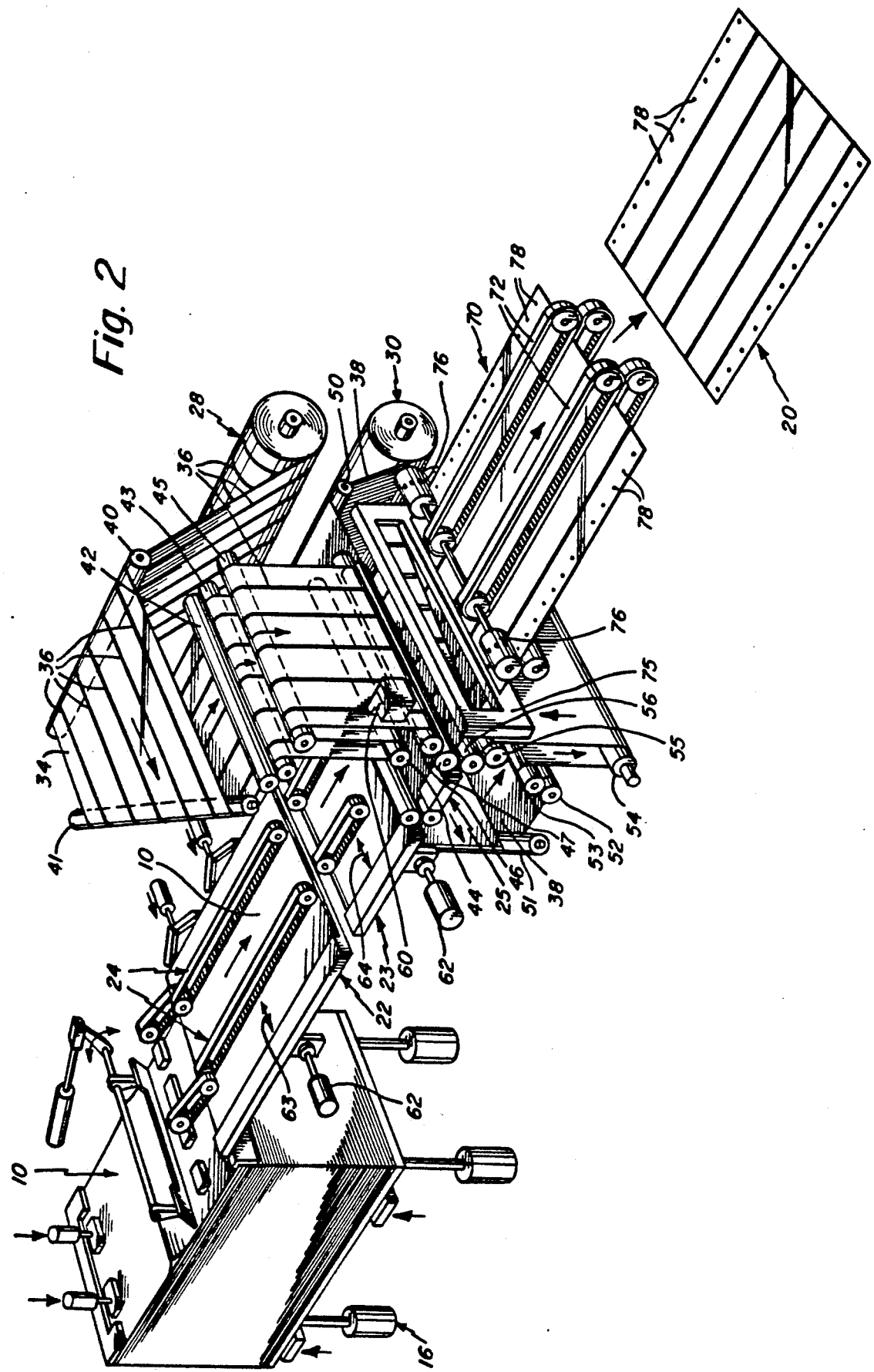

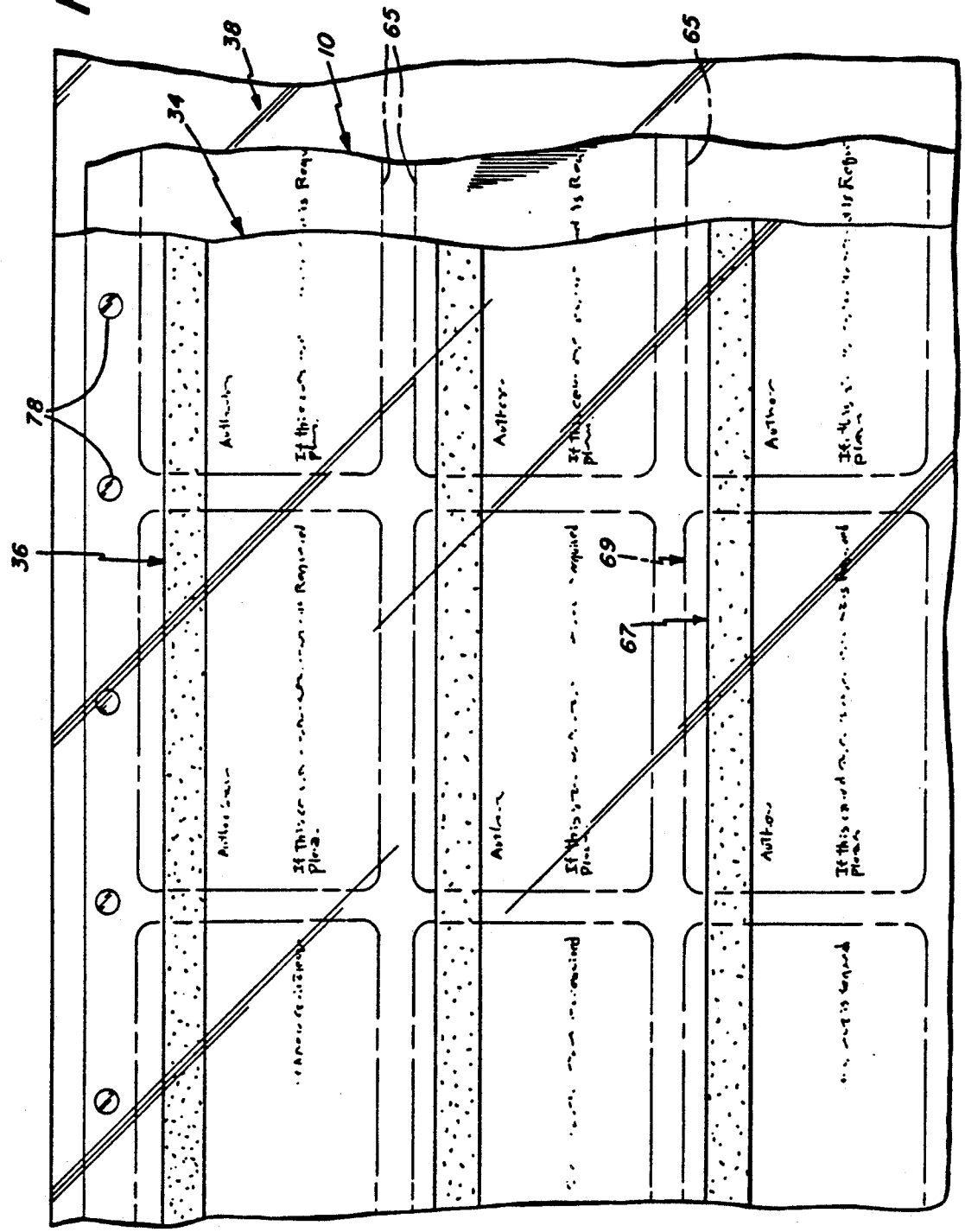

CARD ASSEMBLY APPARATUS

This application is a continuation of application Ser. No. 07/323,494, filed Mar. 14, 1990, now U.S. Pat. No. 4,978,401 issued Dec. 18, 1990.

BACKGROUND OF THE INVENTION

The present invention relates in general to a card assembly apparatus, and pertains more particularly, to a card stock assembly machine that may be employed in the manufacture of, for example, laminated credit cards.

At the present time, in the manufacture of laminated cards, such as laminated credit cards, there are multiple steps that have to be carried out in constructing these cards. The production of the card can in general be separated into at least two steps including the use of a first machine that provides a laminated card comprised of a printed core material with top and bottom overlays for protecting the core material. Subsequently, with the use of a separate machine, a magnetic stripe is individually applied to the previously laminated card. This magnetic stripe may be applied with the use of a rolling die, typically referred to in the art as with the use of a roll-on machine. Alternatively, the stripe may be individually applied with the use of other types of machines for individually applying what is commonly referred to as the "signature panel".

It is an object of the present invention to simplify this card assembly procedure so that it can be carried out essentially with a single machine thus realizing an advantageous reduction in capital expenditure and associated operating costs.

Another object of the present invention is to provide a card stock assembly machine that is characterized by the capability to automatically register and secure the different layers employed in the construction of the laminated credit card.

A further object of the present invention is to provide a card assembly apparatus and associated method of card assembly in which the method can be carried out more simply, requiring fewer steps and requiring far less expenditure as far as capital equipment is concerned.

SUMMARY OF THE INVENTION

To accomplish the foregoing and other objects, features and advantages of the invention, there is provided a card assembly apparatus. This card assembly apparatus may be in the form of a machine that is adapted to construct a laminated card assembly. This laminated card assembly may then be sectioned so as to provide individual laminated cards such as credit cards. In accordance with the invention there is provided a stock of printed card sheets. These are typically provided in flat sheet form and are adapted to be printed in separate individual card formats. Means are provided for feeding the sheets one at a time to a laminating station of the machine. There is also a source of an overlay web having arranged thereon a series of parallel disposed magnetic stripes and means are provided for feeding this overlay web to the laminating station also. The feeding of both the card sheets and the overlay web is carried out concurrently so as both are coupled at the same time at the laminating station so as to form a laminate structure. There is also preferably provided a second overlay web and means for also feeding this second web to the laminating station. One overlay web is for covering one side of the card sheet and the second overlay web is for covering the opposite side of the card sheet. In the making of credit cards, it is desired to maintain the printing on both sides of the card covered. The second overlay web is preferably a plain transparent web whereas, as mentioned previously, the first overlay web has the magnetic stripes disposed thereon in a parallel array. Means are provided for controlling the inter-positional relationship between the card sheet and the overlay web so as to maintain a predetermined positional arrangement between the magnetic stripe and a predetermined position on the card sheet. In this regard, the card sheet preferably has multiple lengthwise card segments with each card segment being a series of individual cards. The overlay web is preferably provided in a continuous roll. The means for controlling the inter-positional relationship between the card sheet and the overlay web, comprises registration means which in turn includes means for detecting the web position and also means for adjusting the card sheet position in the event of a misalignment of the magnetic stripe and the card sheet. With this registration arrangement, the overlay sheet that has the magnetic stripe on it can be properly oriented so that the magnetic stripe falls on the proper position of the card sheet with each magnetic stripe overlaying a predetermined position on the card segments. More particularly, the magnetic stripe is adapted to be positioned on an individual credit card basis so that it is in the proper position in a side to side relationship relative to the card. The aforementioned means for detecting web position may comprise a magnetic stripe detector. Other features of the present invention include a means for at least temporarily affixing the web and card sheet together. This may be referred to as a tacking mechanism that introduces a series of intermittent welded spots to securely affix preferably both overlay materials to the card sheet in preparation for subsequent processing. The subsequent processing is basically carried out by a device that die cuts into individual cards such as credit cards. In accordance with another feature of the present invention, there is provided means for cutting the web to a length comparable to each sheet length so that at the output of the machine there is a series of sheets that are outputted each laminated in accordance with the concepts of the invention.

BRIEF DESCRIPTION OF THE DRAWINGS

Numerous other objects, features and advantages of the invention should now become apparent upon a reading of the following detailed description taken in conjunction with the accompanying drawing, in which:

FIG. 2 is a more detailed perspective view illustrating the machine of this invention as employed with both a top overlay material with the magnetic stripe thereon and a bottom plain overlay material; and FIG. 3 is a view of the laminate construction illustrating the materials comprising the construction and also illustrating the inter-positional relationship or registration in particular of the top overlay material with its magnetic stripe and the printed card sheet or core material.

DETAILED DESCRIPTION

Figure 1:
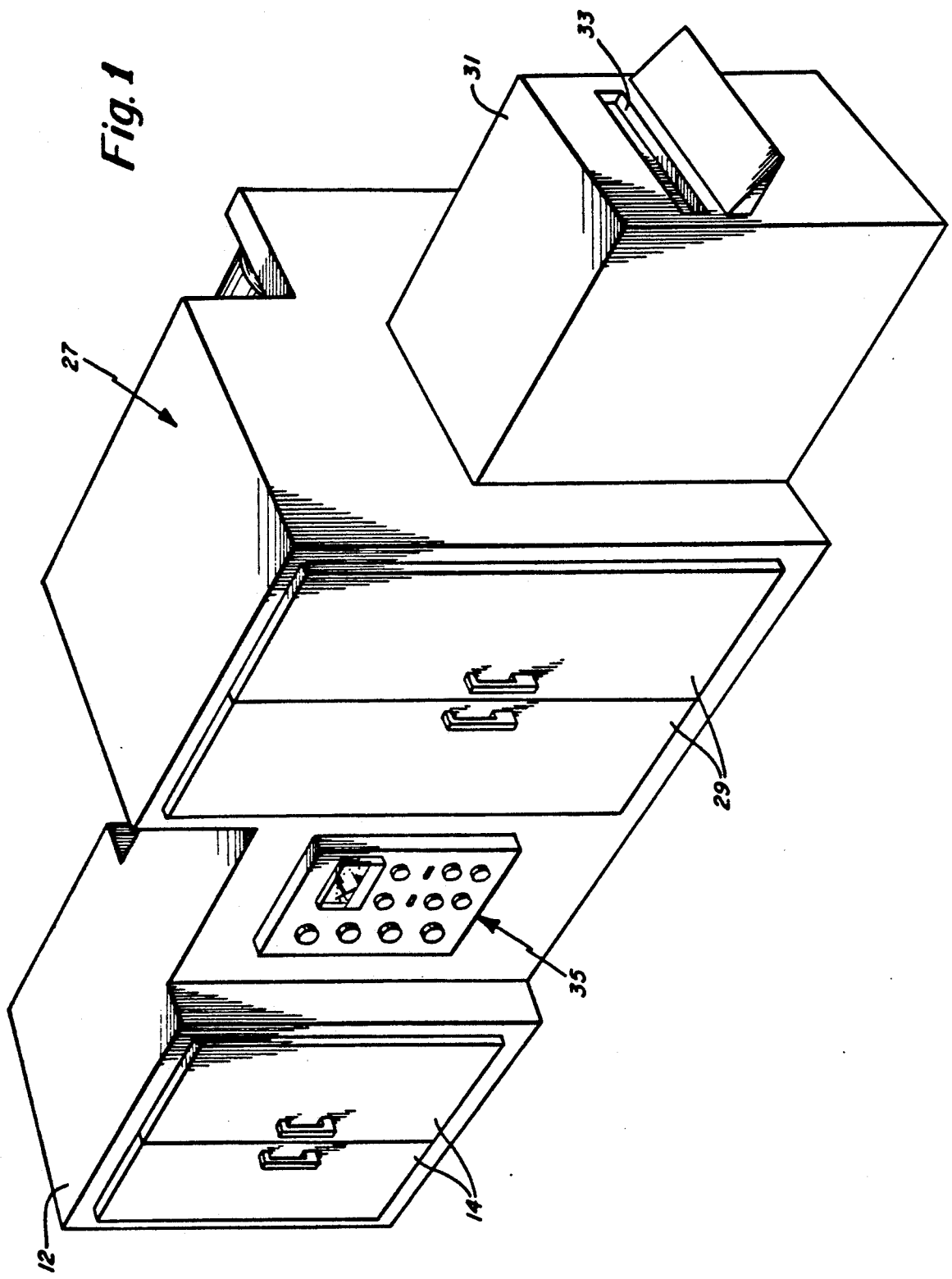
FIG. 1 is a perspective view showing the overall cabinetry used with the machine of the present invention.

Referring now to the drawings, there is shown in FIG. 1 the general cabinetry that is used with the card assembly apparatus or machine of the present invention.

FIG. 2 is a perspective view showing the internal mechanisms that are used in the machine. There is provided a stock of printed card sheets 10 arranged in a stack. This stack of sheets 10 is contained within cabinet 12 shown in FIG. 1. The cabinet 12 is preferably provided with doors 14 which provide access to the interior of the cabinet 12. A conventional support mechanism 16 is shown for supporting the stack of printed card sheets 10.

FIG. 2 also illustrates a means for feeding the sheets 10 one at a time to a laminating station. The laminating station may be considered as simply the area at which the various materials are joined together to form a lamination. In FIG. 2 the finely laminated sheet is shown at 20. Subsequent operations are carried out on the sheet 20 as to be described in further details hereinafter.

The means for feeding the sheets 10 one at a time includes a support table 22 and belt-type feed mechanisms 24. The card sheet feed mechanisms illustrated in detail in FIG. 2 are for the most part conventional, and operate in a conventional manner to feed individual sheets to the laminating station. The laminating station is indicated in general by the reference character 25.

The card assembly apparatus of the present invention also includes means for feeding both a top overlay material and a bottom overlay material to the laminating station. In this regard in FIG. 2 there is illustrated a top overlay material roll 28 and a bottom overlay material roll 30. With regard to FIG. 1, the area of the machine including the rolls 28 and 30 is contained within the cabinetry 27. As illustrated in FIG. 1 the cabinetry 27 is provided access thereto by means of the large front doors 29. At the output to the machine there is also provided an output cabinetry 31 having an output slot 33 through which the laminate card 20 shown in FIG. 2 couples. Also illustrated in FIG. 1 is a control panel 35 having associated therewith, means for controlling various aspects of the operation of the machine, some of which are discussed in more detail hereinafter.

The top overlay material roll 28 feeds an overlay web 34 having arranged thereon a series of parallel disposed magnetic stripes 36, each extending longitudinally of the web and spaced evenly along the transverse width of the web.

The bottom overlay material role 30 also is in the form of a web 38. This is preferably a plain transparent thin plastic material. The overlay web 34 is also of a clear plastic material. The magnetic stripes may be deposited thereon using known techniques.

In FIG. 2, for the sake of simplicity, much of the support structure is not illustrated. However, there are illustrated a series of rollers which are each of course supported for proper rotation. The support mechanisms are not illustrated for the sake of maintaining the drawing more simplified. Thus, for example, with respect to the feeding means for the web 34, there are provided in sequence, rollers 41, 42, 43, 44, 45, 46, and 47. Similarly, there is a feed means associated with the overlay material roller 30. This includes properly supported rollers 50, 51, 52, 53, 54, 55, and 56. It is noted that the rollers 47 and 56 are in juxtaposition and the individual core material sheets 10 are essentially fed therebetween with the top overlay material web 34 being directed to the top of the card sheet and the bottom plain overlay material web 38 being directed to the underside of the card sheet 10.

The web feeding mechanisms, as indicated previously, comprise a series of rolls. These individual rolls are adapted to provide for constant tension feed from each of the individual supply rolls. In this connection, there are a series of guiding rollers, turnover rollers, slack take-up rollers and nip rollers. These various roller mechanisms may for the most part, be of conventional design and provide mechanisms for supplying the two overlay material. The top overlay material with the magnetic stripe applied, is wrapped about the final roller 47 and is conveyed about that roller and onto the top of the card sheet. Similarly, the final roller 56 associated with the bottom overlay material feeds this material to the underside of the card sheet.

In accordance with the present invention, there is furthermore provided for registration or proper positioning of, in particular, the top overlay web 34, relative to the side-to-side position of the printed card sheets that are being fed to the laminating station. The registration system may comprise guide rails, registration edge bars, and motor driven mechanisms to advance the card sheets on demand.

It is noted that the registration mechanism receives the material from the stock feeder via the table 22 and the registration system is adapted to align each and every sheet to a lateral position in accordance with command signals generated from the magnetic stripe detector 60.

Thus, as each of the individual sheets 10 are fed toward the laminating station, they are driven in a linear direction by virtue of some of the feed mechanisms illustrated, such as the mechanisms 24. In addition, the feed tables that support these sheets are adapted to be controlled for certain side translational movement. In this regard, note the registration motors or mechanisms 62 which are adapted to move the tables 22 and 23 in the direction of arrows 63 and 64, respectively. The mechanisms 62 may include motors and associated lead screws for altering the side-to-side position of the tables and correspondingly of the individual printed card sheets 10. The control by means of the mechanisms 62, is for aligning the printed card sheets properly with the magnetic stripes so that the alignment occurs as substantially illustrated in FIG. 3.

FIG. 3 illustrates the positional inter relationship that is desired in particular, between the web 34 and the card sheet 10. FIG. 3 also illustrates the magnetic stripe 38. In FIG. 3 there is shown the outline of the individual credit cards by virtue of the phantom perimeter outline 65. The magnetic stripe 36 is to be arranged so that the edge 67 thereof is within a predetermined distance of the edge 69 at the perimeter 65 of one of the individual credit cards.

In operation, the web 34 and the card 10 may be adjusted relative to each other so that the magnetic stripe 38 is in the proper position. The magnetic stripe detector 60 is then positioned appropriately so as to be in registry with one of the magnetic stripes. If during the operating sequence, the magnetic stripe detector 60 indicates the magnetic stripe becoming out of registry, then a feedback signal is coupled to the mechanisms 62 so as to orient the printed card sheets being inputted to the laminating station to compensate for this out of alignment condition. In this way in a positive and negative feedback arrangement, the magnetic stripe detector is instrumental in maintaining the card sheets in the proper position for proper aligning with the web 34 and the magnetic stripes 36 thereon. In this regard, it is noted that the card sheets are registered with the web 34 instead of the web 34 being registered to the card sheets. This approach resolves many difficulties encountered when a slow speed and/or intermittent web has to be kept in precise alignment. It has been found in accordance with the present invention that it is much more easy to align the sheets rather than to try to control the alignment of the web, particularly with all of the different rollers that are used for web control.

There is preferably also included as part of the system, two pairs of overlay web nip rollers, one on each side of the sheet 10 for performing delivery of the materials at the output of the mechanism. Under control of the registration mechanism, these rollers are moved in the direction of the sheet 10 for conveying it and may later be retracted to stop operation.

In accordance with the operation of the machine, it is preferred that registration occur and then once the sheets are registered, the drive can be engaged so as to feed the sheet and the two overlays concurrently and in synchronism. In this regard in FIG. 2, it is noted that there is shown at 70, one of the laminates that has now been fabricated. Also associated therewith are feed mechanisms 72, essentially at the output of the device for feeding the graphic assembly.

Although not described in detail herein, it is understood that in a later step in forming the individual credit cards, a die arrangement is used for cutting the individual cards. This cutting would occur basically along the perimeter of the card as indicated by the phantom perimeter line 65 in FIG. 3.

As indicated in FIG. 2, it is noted that there is a preferred gap between each of the individually fed card sheets or card stock. This gap is provided so as to enable cutting of both of the overlay webs so that the end product is separated into separate individual sheets such as the laminated sheet 20 illustrated in FIG. 2.

This cutting may be carried out by basically one of two different methods. For example, a standard guillotine may be activated for cutting the overlay webs. Alternatively, an electrically heated resistance wire or rod may be activated for cutting the overlay materials. One such cutting mechanism 75 is illustrated in FIG. 2.

Also, in accordance with the machine illustrated in FIG. 2, there is provided a tacking mechanism so that the overlay materials are at least temporarily secured on either side of the card stock or card sheet. As the card sheet laminate advances through the machine, there are a series of heated rollers 76 which are preferably synchronized for speed and displacement. These rollers introduce a series of spaced weld spots shown as spots 78 in FIG. 2. These welded spots which are actually simply a fusing of the plastic overlays securely affix both overlay materials to the card stock in readiness for subsequent processing.

To complete the manufacturing process and previous to the die cutting step, there may be provided a standard process for completing the laminating of the three layers comprising the basic card. This standard laminating process includes heating, the application of pressure and subsequent cooling to provide proper laminating interlocking of the three layers comprising the card. Thereafter, the cards may then be cut into separate cards as illustrated in FIG. 3. This cutting into separate cards may be carried out by a standard die cutting machine.

In summary, in accordance with the apparatus and associated method of the present invention, there is provided for a stock of printed card sheets which are fed, preferably one at a time to a laminating station. Both top and bottom overlay rolls feed respective overlay webs also to the laminating station where a lamination is formed comprised of the sheet covered on opposite sides by the top and bottom overlay materials. The bottom overlay material is preferably transparent and plain and the top overlay material may be similar but is provided with a series of parallel disposed magnetic stripes. These magnetic stripes may be deposited on the web by a deposition technique that is known and the top overlay web is simply provided on a roll and is fed with the magnetic stripes affixed thereto to the laminating station. The card sheet along with the overlay webs are fed concurrently to the laminating station to form the lamination. Means are provided for registering, in particular, the top overlay material with the card sheet so as to maintain a predetermined positional arrangement between the magnetic stripe and a predetermined position on the card sheet such as illustrated in FIG. 3.

Having described one embodiment of the present invention, it should now be apparent to those skilled in the art that numerous other embodiments are contemplated as falling within the scope of this invention.

What is claimed is:

1. Card assembly apparatus for producing a laminated card comprising;
   a stock of printed card sheets,
   means for feeding the sheets one at a time to a laminating station, the means for feeding including conveyor table means to transfer the sheets from the stock to the lamination station and to guide and retain the sheets in a direction transverse to a feeding direction as the sheet is transferred,
   a source of an overlay web having arranged thereon a series of parallel disposed magnetic stripes,
   means for feeding the overlay web so as to form a lamination with the sheets,
   and means for altering the position, in a direction transverse to the feeding direction, of the conveyor table means in response to the positioning of one of the magnetic stripes so that each of the stripes is overlaid in alignment with a predetermined transverse position on each of the card sheets as the sheets are fed from the conveyor table means to the laminating station.

2. Card assembly apparatus as set forth in claim 1 wherein said card sheets are flat and are adapted to be printed in separate individual card format.

3. Card assembly apparatus as set forth in claim 1 wherein said card sheet has multiple lengthwise card segments, the number of which correspond to the number of magnetic stripes.

4. Card assembly apparatus as set forth in claim 3 wherein each card segment is separated into a plurality of individual cards.

5. Card assembly apparatus as set forth in claim 1 wherein said overlay web is provided in a continuous roll.

6. Card assembly apparatus as set forth in claim 5 wherein the stock of card sheets includes a stack of individual sheets having a length substantially less than the length of the continuous roll web.

7. Card assembly apparatus as set forth in claim 6 including means for cutting the web to a length comparable to each sheet length.

8. Card assembly apparatus as set forth in claim 1 wherein said means for controlling feed includes selectively operated feed rollers.

9. Card assembly apparatus as set forth in claim 1 including means for cutting the web to a length comparable to card sheet length.

10. Card assembly apparatus as set forth in claim 1 wherein said means for detecting web position includes a magnetic stripe detector.

11. Card assembly apparatus as set forth in claim 1 including means for at least temporarily affixing the web and card sheet.

12. Card assembly apparatus as set forth in claim 1 including a source of a second overlay web and means for feeding the second web also to the laminating station.

13. Card assembly apparatus as set forth in claim 12 wherein one overlay web is for covering one side of the card sheet and the second overlay web is for covering the opposite side of the card sheet.

14. Card assembly apparatus as set forth in claim 13 wherein the second overlay web is a plain transparent web.

15. Card assembly apparatus as set forth in claim 1 wherein the conveyor table means includes a table having guides for engaging transverse sheet edges and a conveyor belt means disposed to contact a surface of the sheet opposite a surface of the sheet that contacts the table, the conveyor belt means being fixedly attached to the table.

16. Card assembly apparatus as set forth in claim 15 wherein the means for controlling includes linear motors for transversely moving the table.

17. A system for producing a laminated card sheet having a plurality of card cores thereon, each of the cores including a magnetic stripe, comprising:

means for storing a plurality of card stock sheets each having a plurality of card cores thereon, the cores being oriented in rows aligned in a feeding direction and transverse columns;

conveyor table means to transfer each of the sheets in sequence in the feeding direction from the means for storing to a laminating station while retaining the sheets stationarily in a direction transverse the feeding direction;

means for directing, in the feeding direction, a substantially transversely stationary overlay web to the lamination station, the overlay web including a series of parallel disposed magnetic stripes positioned in the feeding direction so as to each correspond to one of the rows of credit card cores upon each of the sheets; and means for transversely repositioning the conveyor table means in response to detection of the transverse position of at least one of the magnetic stripes so that each of the sheets is aligned to converge with the overlay web, each of the magnetic stripes being positioned at a predetermined transverse location upon each of the rows of card cores as each of the sheets is transferred from the conveyor table means to the laminating station.

18. The system as set forth in claim 17 wherein the means for transversely repositioning includes a magnetic stripe detector oriented to signal transverse misalignment of the stripe as it passes therethrough.

19. The system as set forth in claim 18 wherein the means for transversely repositioning includes at least one linear motor for moving the conveyor table means back and forth in a direction transversely to the feeding direction.

20. The system as set forth in claim 19 wherein the conveyor table means includes a table for supporting the sheets and means for guiding opposing edges of the sheets to retain them transversely to the feeding direction.

21. The system as set forth in claim 20 wherein the conveyor table means includes conveyor belt means fixedly attached to the table and contacting a surface of the sheets to move them in the feeding direction upon the table.

* * * * *